United States Patent
Hung et al.

(10) Patent No.: US 6,996,636 B2
(45) Date of Patent: Feb. 7, 2006

(54) ACTIVE USB DEVICE

(75) Inventors: Ching-Fu Hung, Hsinchu (TW);
Kung-Wang Lee, Hsinchu (TW);
Shih-Chou Juan, Taoyuan County (TW)

(73) Assignee: Ours Technology Inc., Hsinchu (TW)

( * ) Notice: Subject to any disclaimer, the term of this patent is extended or adjusted under 35 U.S.C. 154(b) by 57 days.

(21) Appl. No.: 10/605,236

(22) Filed: Sep. 17, 2003

(65) Prior Publication Data

US 2005/0010699 A1    Jan. 13, 2005

(30) Foreign Application Priority Data

Jul. 8, 2003    (TW) .............................. 92118562 A

(51) Int. Cl.
*G06F 13/00*    (2006.01)

(52) U.S. Cl. ............................... 710/8; 710/14; 710/12; 710/110; 710/62

(58) Field of Classification Search .................... 710/5, 710/8, 12, 14, 62, 72–74, 110, 305; 709/208
See application file for complete search history.

(56) References Cited

U.S. PATENT DOCUMENTS

| | | | | |
|---|---|---|---|---|
| 5,784,581 A | * | 7/1998 | Hannah | 710/110 |
| 6,732,218 B2 | * | 5/2004 | Overtoom et al. | 710/313 |
| 2002/0161844 A1 | * | 10/2002 | Overtoom | 709/208 |
| 2004/0036895 A1 | * | 2/2004 | Yano et al. | 358/1.6 |
| 2004/0042138 A1 | * | 3/2004 | Saito et al. | 361/90 |

FOREIGN PATENT DOCUMENTS

NL    WO 2004/029817 A1 *  5/2003

* cited by examiner

*Primary Examiner*—Kim Huynh
(74) *Attorney, Agent, or Firm*—Jiang Chyun IP Office

(57) ABSTRACT

The embodiment of the present invention provides an USB device that can be directly connected to another USB device to allow data exchange to take place without involving a use of a computer. Further, the embodiment of the invention also exploits a MP3 codec to allow voice data to be played or recorded via the USB device of the embodiment of the invention.

17 Claims, 2 Drawing Sheets

ACTIVE USB DEVICE

CROSS REFERENCE TO RELATED APPLICATIONS

This application claims the priority benefit of Taiwan application serial no. 92118562, filed Jul. 08, 2003.

BACKGROUND OF INVENTION

1. Field of the Invention

The present invention generally pertains to an universal serial bus (USB) device, and more particularly to an USB device that accesses another USB device without going through a host computer.

2. Description of the Related Art

A portable electronic device is generally equipped with a small memory device such as a flash memory card. For instance, a digital camera (DC) or a personal digital assistant (PDA) commonly uses a flash memory card to store application data. For a small size and a big storage capacity, the flash memory card is used popularly nowadays. It is noted that an electronic device or a computer equipped with a built-in card connector can directly access a flash memory card via the built-in card connector, and if an electronic device or a computer not equipped with a built-in card connector, an external flash memory card reader is required for the electronic device or the computer to access a flash memory card. Further, in a current market, a portable data storage device that integrates a flash memory card and a flash memory card reader together into one is usually named traveling disc. Currently, a size of a traveling disc is small enough to put in a packet and not get noticed, and a storage capacity of a traveling disc is at a range of tens of mega bytes to hundreds of mega bytes. For a feature of small size, big storage capacity, and reusability, a traveling disc is getting popular to become a commonly used portable storage device and has a tendency to replace a floppy disc or a rewritable CD-ROM (compact disc—read only memory).

Upon an exploiting of a current IC technology, a newly developed traveling disc equips with a bigger storage capacity than before and uses a most popular universal serial bus (USB) as its input/output (I/O) interface, the traveling disc becomes one of the best selling computer peripheral devices in the market. However, the traveling disc is a passive device; it must depend on a host computer to store or retrieve data. Without a host computer, a traveling disc will not be able to copy or store data to another traveling disc. Further, a USB port electronic device such as a digital camera must use a computer to transfer image data to a traveling disc using a USB interface. A traveling disc can not connect to an electronic device directly to retrieve or store data.

SUMMARY OF INVENTION

Accordingly, one object of the present invention is to provide an USB data storage device that directly accesses another USB device to retrieve or store data without being through a host computer.

Another object of the present invention is to provide an USB data storage device that is equipped with a MP3 decoder/encoder (codec) to play MP3 music and to transfer an analog voice data to a digital voice data to be stored in its storage.

Yet another object of the present invention is to provide an USB data exchange device that directly accesses another USB device to retrieve or store data without involving a host computer. The USB data exchange device comprises an USB interface module and a function module.

According to one aspect of the present invention, the USB interface module mentioned above comprises an USB host core circuit and an USB device core circuit. The USB host core circuit is activated as an interface to an USB device if the USB device is at device mode. On the other hand, the USB device core circuit of the USB interface module is activated as an interface to an USB device if the USB device is at host mode.

According to another aspect of the present invention, the USB interface module further comprises a first switch, a second switch, and a third switch. A terminal of the first switch is electrically connected to a D+ signal line of an USB interface. The other terminal of the first switch is electrically connected to a high voltage level. A terminal of the second switch is electrically connected to the D+ signal line, and the other terminal of the first switch is electrically connected to a ground reference. A terminal of the third switch is electrically connected to a D− signal line of the USB interface, and the other terminal of the third switch is electrically connected to the ground reference. As an USB device at device mode connecting to the USB device of the embodiment of the present invention, the first switch is open, and the second and third switches are close. On the other hand, as an USB device at host mode connecting to the USB device of the embodiment of the present invention, the first switch is close, and the second and third switches are open.

According to another aspect of the present invention, the function module comprises a mass storage device, a buffer device, and a control device. The mass storage device is used to store data. When an USB device connecting to the USB device of the embodiment of the present invention is at a device mode, the function module accesses the USB device via the host core circuit to retrieve or store data to the USB device. The buffer device is used to store data temporarily. The control device controls the mass storage device, buffer device, and the USB interface module.

According to yet another aspect of the present invention, the function module further comprises a MP3 codec. The MP3 codec transfers a MP3 music stored in the buffer device to an analog voice data and outputs the analog voice data as the USB device of the embodiment of the present invention is at MP3 play mode.

According to yet another aspect of the present invention, the mass storage device comprises a nonvolatile storage media used to store data and a storage interface used to access data stored in the nonvolatile storage media.

According to yet another aspect of the present invention, the control device comprises a central processing unit (CPU) as a control center of the USB device, a nonvolatile memory to store a driver program of the USB interface module, and a volatile memory used by the CPU to temporarily store CPU data.

According to yet another aspect of the present invention, the USB of the present invention equips a traditional USB device with an USB host function, the USB device of the embodiment of the present invention consists of a function of USB host and a function of USB device. Therefore, a regular USB device can be directly connected to the USB device of the embodiment of the invention, and a data transfer can take place between the two USB devices without involving a use of a computer.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. The drawings are as follows.

DETAILED DESCRIPTION

Figure 1:
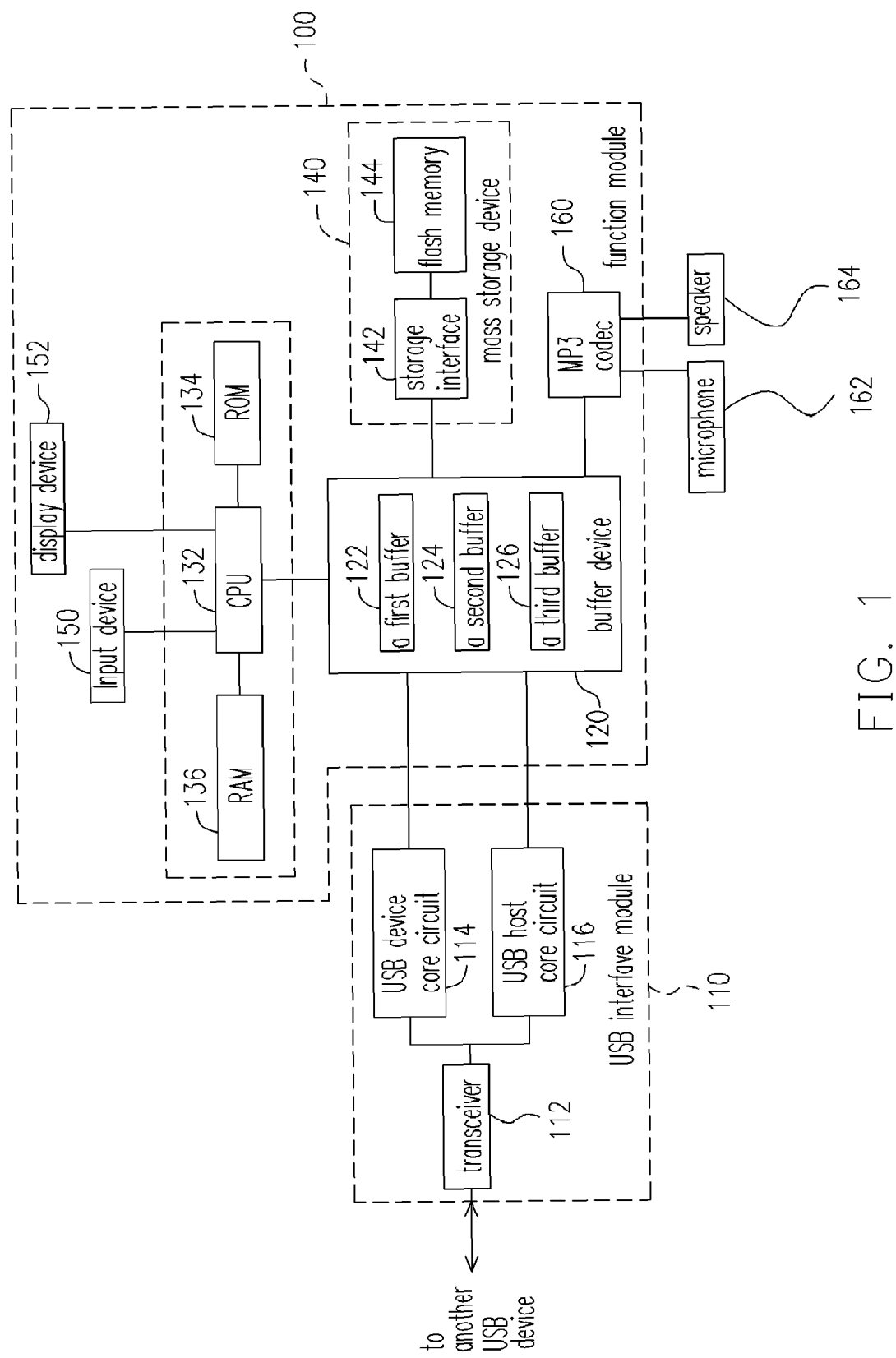
FIG. 1 depicts a data exchangeable USB device of the preferred embodiment of the present invention in a block diagram.

Referring to FIG. 1, a data exchangeable USB device of the preferred embodiment of the present invention is depicted in a block diagram. The data exchangeable USB device of the preferred embodiment of the present invention can be electrically coupled directly to an electronic device with an USB port, such as a portable disc or a digital camera. The USB device comprises an USB interface module 110 and a function module 100.

In the preferred embodiment of the present invention, the USB interface module 110 comprises a transceiver 112, an USB device core circuit 114 and an USB host core circuit 116. The transceiver 112 electrically and mechanically connects to another USB device. The USB device core 114 is activated to interface with another USB device if the another USB device functions at a host mode. On the other hand, the USB host core circuit 116 is activated as an interface to another USB device if the another USB device is at a device mode.

Figure 2:
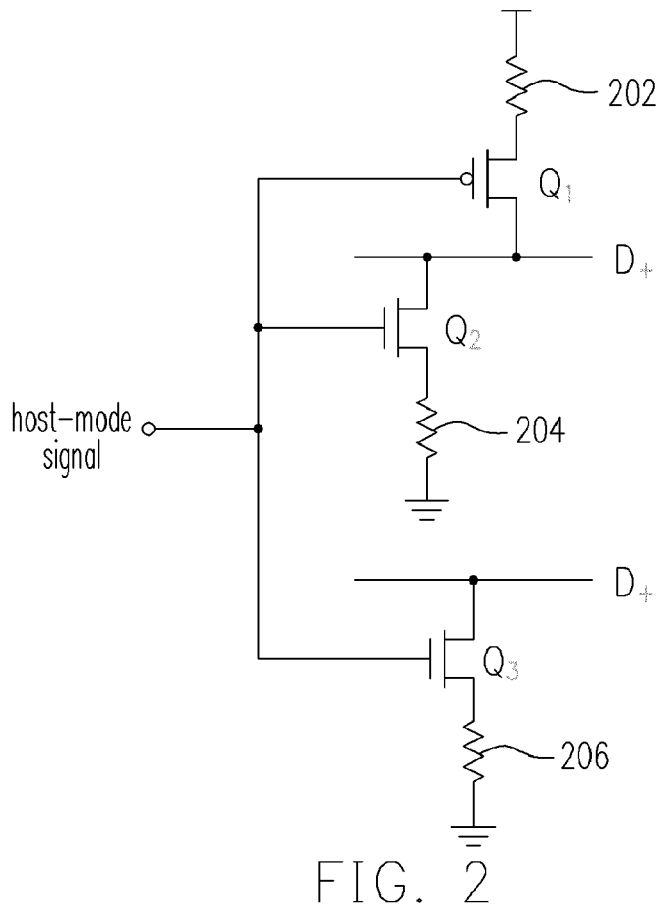
FIG. 2 depicts a part of an USB interface module circuit diagram of the preferred embodiment of the present invention.

Referring to FIG. 2, a part of an USB interface module circuit diagram of the preferred embodiment of the present invention is demonstrated. In the preferred embodiment of the present invention, the part of the USB interface module circuit diagram comprises a first transistor Q1, a second transistor Q2, and a third transistor Q3. A terminal of the first transistor Q1 is electrically connected to a D+ signal line of an USB interface, and another terminal of the first transistor Q1 is electrically connected to a high voltage reference via a pull-up resistor 202. A terminal of the second transistor Q2 is electrically connected to the D+ signal line of the USB interface, and another terminal of the second transistor Q2 is electrically connected to a ground reference via a first pull-down resistor 204. A terminal of the third transistor Q3 is electrically connected to a D– signal line of the USB interface, and another terminal of the third transistor Q3 is electrically connected to a ground reference via a second pull-down resistor 206.

It is noted that the first transistor Q1 and the second transistor Q2 are of different types, and the second transistor Q2 and the third transistor Q3 are of same type. The three transistors Q1, Q2, Q3 are controlled by a host-mode signal. The host-mode signal is enabled when an USB device is at a device mode and is connected to the USB device of the embodiment of the invention. As a result, the first transistor Q1 is turned off, and the second and third transistors Q2, Q3 are turned on. On the other hand, when an USB device is at a host mode and is connected to the USB device of the embodiment of the invention, the host-mode signal is disabled, so that the first transistor Q1 is turned on, and the second and third transistors Q2, Q3 are turned off.

Referring to FIG. 1, in the preferred embodiment of the invention, the function module 100 is electrically connected to an USB interface module. The function module 100 comprises a buffer device 120, a control device 130 and a mass storage device 140. The mass storage device is used to store data, and when an USB device is at a device mode and is connected to the USB device of the embodiment of the invention, the function module automatically activates the host core circuit 116 to access the USB device connected to it. The buffer device 120 is electrically connected to the mass storage device 140 and the USB interface module 110, and is used to temporarily store data. The control device 130 is used to control the mass storage device 140, the buffer device 120, and the USB interface module 110. In the preferred embodiment of the invention, the mass storage device 140 comprises a storage interface 142 and a flash memory 144 (a nonvolatile storage media). The flash memory 144 is for storing data, and is electrically connected to the storage interface 142 so that the flash memory 144 can be accessed via the storage interface 142.

In the preferred embodiment of the invention, the control device 130 comprises a CPU 132, a read-only memory (ROM) 134 (a nonvolatile memory), and a random access memory (RAM) 136 (a volatile memory). The CPU 132 is a control center of the USB device. The ROM 134 electrically connected to the CPU 132 is used to store a driver program of the USB interface module 110. The RAM 136 is electrically connected to the CPU 132 to temporarily store CPU 132 data.

Figure 3:
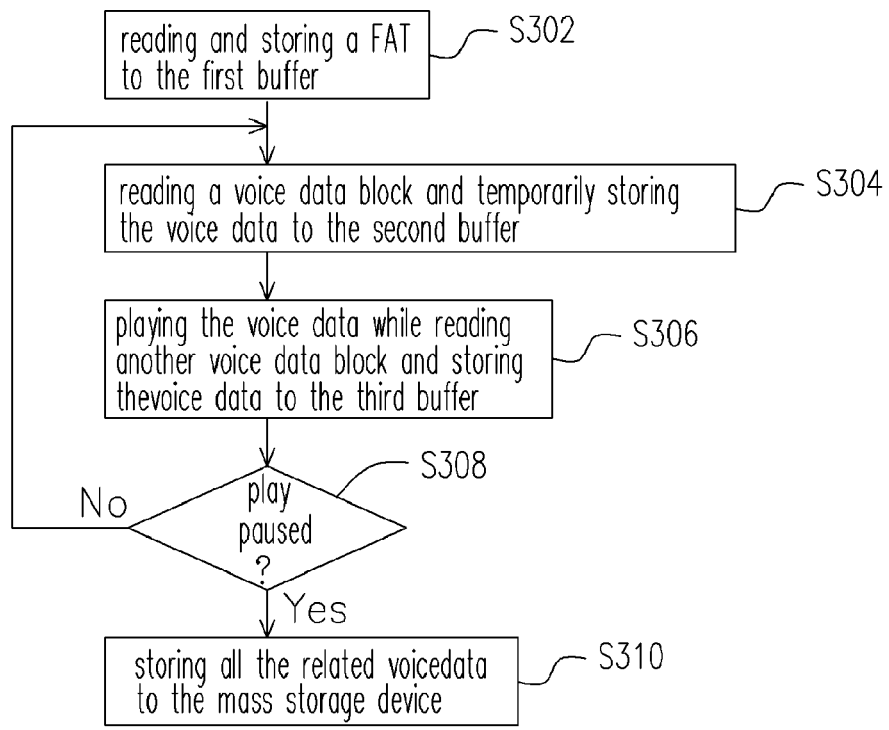
FIG. 3 depicts a MP3 music retrieving and playing flowchart diagram of the preferred embodiment of the present invention.

In the preferred embodiment of the invention, the buffer device 120 comprises a first buffer 122, a second buffer 124, and a third buffer 126. The function module 100 further comprises a MP3 codec 160 electrically connected to the buffer device 120 to transfer a MP3 music stored in the buffer device 120 into an analog voice data during a play-state. Referring to FIG. 3, a flow-chart diagram of retrieving and playing MP3 music of the preferred embodiment of the invention is depicted.

Referring to FIG. 1 and FIG. 3, the USB device of the preferred embodiment of the invention (a client USB device) first reads a file allocation table (FAT) from another USB device (host USB device) to the first buffer 122 in step s302. According to the FAT stored in the first buffer 122, voice data stored in a voice data block of the host USB device is read and stored to the second buffer 124 in step s304. Then, while playing a music stored in the second buffer 124, another voice data block of the host USB device is read and stored to the third buffer 126 in step s306. Further, while playing a music stored in the third buffer 126, another voice data block of the host USB device is read and stored to the second buffer 124. By repeating step s304 and step s306, a music stored in the host USB device is played continuously on the client USB device without involving a computer to connect these two USB devices. During a play pause in step s308, all related music data blocks of the host USB device are read and stored to the mass storage device 140 as demonstrated in step s310.

Referring to FIG. 1, when an USB device connected to an USB device according to the preferred embodiment of the present invention is at a host-mode, the USB device of the present invention will automatically configure itself to act at a device-mode to allow the host-mode USB device to access a storage in the device-mode USB device. The host-mode USB device issues a load-instruction or a store-instruction to the device-mode USB device. An instruction from the host-mode USB device first goes to a transceiver 112, then, an USB device core circuit 114, and is temporarily stored in a first buffer 122 of the device-mode USB device. Next, a CPU 132 in the device-mode USB device reads and decodes the instruction from the first buffer 122, and operates accordingly. If the instruction is a read-flash-memory instruction, the CPU 132 provides a corresponding flash memory data and temporarily stores the data to a buffer device 19. Then, the data is transferred to the host-mode USB device via the USB device core circuit 114 and the transceiver 112 of the device-mode USB device. When an USB device is at a device-mode and is connected to an USB device of the embodiment of the invention, the USB device of the embodiment of the invention will automatically configures itself to operate at a host-mode. A memory access or storage access instruction is issued from the host-mode USB device of the embodiment of the invention to the device-mode USB device. A data transfer takes place accordingly as described previously.

In the preferred embodiment of the invention, the function module 100 further comprises a display device 152. The display device 152 is used to display a functional operation status of the USB device. The display device 152 is a liquid crystal display (LCD) or any other kind of display device that can be used to work with the USB device of the embodiment of the present invention.

In the preferred embodiment of the invention, the function module 100 further comprises an input device 150. The input device 150 is a user-friendly interface that provides a mechanism for a user to input an operation instruction. The input device 150 is a keypad, a switch device, or any other kind of user interface that can be used to work with the USB device of the embodiment of the present invention.

In the preferred embodiment of the invention, the USB device also provides an external speaker interface and an external microphone interface so that a voice data stored in the USB device can be played via an external speaker 164, and a voice data can be recorded via an external microphone 162 and the MP3 codec 160 to be stored in the flash memory 144.

As a summary, the data-exchangeable USB device of the embodiment of the present invention can be connected to another USB device directly to allow a data-exchange to take place without involving a use of a computer. Further, via a MP3 codec in the embodiment of the invention, a speaker or a microphone can be directly connected to the data-exchangeable USB device of the embodiment of the present invention to play or to record a voice data accordingly.

It will be apparent to those skilled in the art that various modifications and variations can be made to the structure or to the methods of the preferred embodiment of the present invention without departing from the scope or spirit of the invention. In view of the foregoing, it is intended that the present invention cover modifications and variations of this invention provided they fall within the scope of the following claims and their equivalents.

What is claimed is:

1. A data-exchangeable universal serial bus (USB) device that accesses another USB device directly to store or retrieve data, comprises:
   an USB interface module, comprising: a first switch electrically connected to a D+ signal line of an USB interface at one terminal and to a high voltage level at another terminal, a second switch electrically connected to the D+ signal line of the USB interface at one terminal and to a ground reference at another terminal, and a third switch electrically connected to a D− signal line of the USB interface at one terminal and to the ground reference at another terminal, wherein the first switch is turned off and the second and third switches are turned on when the another USB device operates at a device mode, and the first switch is turned on and the second and third switches are turned off when the another USB device operates at a host mode; and
   a function module, electrically connected to the USB interface module, which further comprises a mass storage device for storing data, and automatically accessing a storage of the another USB device operating at the device mode.

2. The data-exchangeable USB device of claim 1, wherein the first switch is a first transistor in which a pull-up resistor is used to connect the first transistor to the high voltage level; the second switch is a second transistor in which a first pull-down resistor is used to connect the second transistor to the ground reference; the third switch is a third transistor in which a second pull-down resistor is used to connect the third transistor to the ground reference; a type of the first transistor is different from a type of the second transistor and the type of the second transistor is same as a type of the third transistor; the first, the second, and the third transistors are controlled by a host-mode signal; when the another USB device is at the device mode, the host-mode signal is enabled; as a consequence, the first transistor is turned off, the second and the third transistors are turned on; when the another USB device is at the host mode, the host-mode signal is disabled; as a consequence, the first transistor is turned on, the second and the third transistors are turned off.

3. The data-exchangeable USB device of claim 1, wherein the function module further comprises:
   a buffer device, electrically connected to the mass storage device and the USB interface module, for temporarily storing data; and
   a control device, for controlling the mass storage device, the buffer device, and the USB interface module.

4. The data-exchangeable USB device of claim 3, wherein the function module further comprises:
   a MP3 codec, electrically connected to the buffer device, for converting a MP3 data to an analog voice data stored in the buffer device during a play-mode of the data-exchangeable USB device.

5. The data-exchangeable USB device of claim 3, wherein the buffer device further comprises a first buffer, a second buffer, and a third buffer in which the data-exchangeable USB device first reads a file allocation table (FAT) from the another USB device to the first buffer, according to the FAT stored in the first buffer, data stored in a data block of the another USB device is read and stored to the second buffer, then, while consuming data stored in the second buffer, another data block of the another USB device is read and stored to the third buffer, further, while consuming data stored in the third buffer, another data block of the another USB device is read and stored to the second buffer, by repeating a read-and-consume procedure described above, data stored in the another USB device is consumed continuously on the data-exchangeable USB device, and during a play pause, all related data blocks of the another USB device are read and stored to the mass storage device.

6. The data-exchangeable USB device of claim 3, wherein the mass storage device further comprises:
   a nonvolatile storage media, for storing data;
   a storage interface, electrically connected to the nonvolatile storage media, for accessing data stored in the nonvolatile storage media.

7. The data-exchangeable USB device of claim 6, wherein the nonvolatile storage media is comprised of a flash memory.

8. The data-exchangeable USB device of claim 3, wherein the control device comprises:
   a central processing unit (CPU), used as a control center of the data-exchangeable USB device;
   a nonvolatile memory, electrically connected to the CPU, for storing a driver program of the data-exchangeable USB device; and
   a volatile memory, electrically connected to the CPU, for temporarily storing CPU data.

9. A data-exchangeable USB device that is directly connected to another USB device so that data is exchanged between each other, which comprises:
   a function module, controlled by a user, for operating at a device mode or a host mode, and outputting a mode signal; and
   an USB interface module, electrically connected to the function module and the another USB device, comprising a first switch, a second switch, and a third switch, in which the first switch is electrically connected to a D+ signal line of an USB interface and a high voltage level, the second switch is electrically connected to the D+ signal line of the USB interface and a ground reference, and the third switch electrically connected to a D− signal line of the USB interface and the ground reference; further, according to the mode signal, the USB interface module operates accordingly that is when the function module operates at the host mode, the first switch is turned off and the second and third switches are turned on, and when the function module operates at the device mode, the first switch is turned on and the second and third switches are turned off.

10. The data-exchangeable USB device of claim 9, wherein the first switch comprises a first transistor and a pull-up resistor, the second switch comprises a second transistor and a first pull-down transistor, and the third switch comprises a third transistor and a second pull-down transistor.

11. The data-exchangeable USB device of claim 9, wherein the function module comprises:
   a control device, for controlling circuits of the data-exchangeable USB device;
   a buffer device, electrically connected to the control device and the USB interface module, for temporarily storing data; and
   a mass storage device, electrically connected to the buffer device, for storing or retrieving data.

12. The data-exchangeable USB device of claim 11, wherein the mass storage device comprises:
   a nonvolatile storage media, for storing data; and
   a storage interface, electrically connected to the nonvolatile storage media, for accessing the nonvolatile storage media.

13. The data-exchangeable USB device of claim 12, wherein the nonvolatile storage media is comprised of a flash memory.

14. The data-exchangeable USB device of claim 11, wherein the function module further comprises a digital-to-analog (A/D) codec electrically connected to the buffer device, used to convert digital data to analog data while the data-exchangeable USB device is at a play-state.

15. The data-exchangeable USB device of claim 14, wherein the A/D codec is a MP3 codec.

16. The data-exchangeable USB device of claim 11, wherein the control device comprises:
   a CPU, used as a control center to the data-exchangeable USB device;
   a nonvolatile memory, electrically connected to the CPU, for storing a driver program of the data-exchangeable USB device; and
   a volatile memory, electrically connected to the CPU, for temporarily storing CPU data.

17. The data-exchangeable USB device of claim 11, wherein the buffer device further comprises a first buffer, a second buffer, and a third buffer in which the data-exchangeable USB device first reads a file allocation table (FAT) from the another USB device to the first buffer, according to the FAT stored in the first buffer, data stored in a data block of the another USB device is read and stored to the second buffer, then, while consuming data stored in the second buffer, another data block or the another USB device is read and stored to the third buffer, further, while consuming data stored in the third buffer, another data block of the another USB device is read and stored to the second buffer, by repeating a read-and-consume procedure described above, data stored in the another USB device is consumed continuously on the data-exchangeable USB device, and daring a play pause, all related data blocks of the another USB device are read and stored to the mass storage device.

* * * * *